(12) United States Patent
Ryan et al.

(10) Patent No.: US 10,412,000 B2
(45) Date of Patent: Sep. 10, 2019

(54) WIRELESS MESH COMMUNICATIONS NETWORKS

(71) Applicant: BLUWIRELESS TECHNOLOGY LIMITED, Bristol (GB)

(72) Inventors: Stuart Ryan, Bristol (GB); Steven Herbert, Bristol (GB)

(73) Assignee: BLUWIRELESS TECHNOLOGY LIMITED, Bristol (GB)

(*) Notice: Subject to any disclaimer, the term of this patent is extended or adjusted under 35 U.S.C. 154(b) by 27 days.

(21) Appl. No.: 15/354,315

(22) Filed: Nov. 17, 2016

(65) Prior Publication Data

US 2017/0149661 A1 May 25, 2017

(30) Foreign Application Priority Data

Nov. 20, 2015 (GB) .................................. 1520449.8

(51) Int. Cl.
*H04L 12/721* (2013.01)
*H04W 40/02* (2009.01)
(Continued)

(52) U.S. Cl.
CPC .......... *H04L 45/70* (2013.01); *H04L 43/0876* (2013.01); *H04L 45/123* (2013.01);
(Continued)

(58) Field of Classification Search
CPC ............................ H04L 45/70; H04L 43/0876
(Continued)

(56) References Cited

U.S. PATENT DOCUMENTS

| | | |
|---|---|---|
| 2007/0140129 A1 | 6/2007 | Bauer et al. |
| 2009/0116393 A1 | 5/2009 | Hughes et al. |
| 2015/0049614 A1* | 2/2015 | Yamada ................ H04L 45/124 370/238 |

FOREIGN PATENT DOCUMENTS

| | | |
|---|---|---|
| EP | 1587262 A2 | 10/2005 |
| WO | 0039967 A2 | 7/2000 |

OTHER PUBLICATIONS

Combined Examination & Search Report in GB1520449.8, dated May 19, 2016.

* cited by examiner

*Primary Examiner* — Peter G Solinsky
(74) *Attorney, Agent, or Firm* — Mossman, Kumar & Tyler, PC

(57) ABSTRACT

A method of maintaining data packet forwarding information in a first network node of a wireless mesh communications network having a plurality of network nodes interconnected by wireless communications links is disclosed. The method includes receiving respective activity indicators for neighbour network nodes connected with the first network node by respective wireless communications links, and determining respective link indicators for the outgoing wireless communications links of the first network node, each such link indicator being indicative of a data packet transmission characteristic for the link concerned. The method further includes, for each of the outgoing communications links of the first network node, combining the link indicator associated with that outgoing wireless communications link with the activity indicator relating to the neighbour network node connected with the first network node via that outgoing wireless communications link, thereby to generate a routing value for the outgoing wireless communications link for the destination network node. A selected next communications (Continued)

link for the destination network node is determined from the generated routing values; and is then stored as forwarding information relating to the selected next communications link for the destination network node concerned.

32 Claims, 5 Drawing Sheets

(51) Int. Cl.
*H04W 40/04* (2009.01)
*H04W 40/24* (2009.01)
*H04W 84/18* (2009.01)
*H04L 12/841* (2013.01)
*H04L 12/26* (2006.01)
*H04L 12/741* (2013.01)

(52) U.S. Cl.
CPC .......... *H04L 45/124* (2013.01); *H04L 45/127* (2013.01); *H04L 45/74* (2013.01); *H04L 47/283* (2013.01); *H04W 40/02* (2013.01); *H04W 40/04* (2013.01); *H04W 40/246* (2013.01); *H04W 84/18* (2013.01)

(58) Field of Classification Search
USPC .......................................................... 370/338
See application file for complete search history.

WIRELESS MESH COMMUNICATIONS NETWORKS

The present invention relates to wireless mesh communications networks, and in particular to routing of data packets in such networks.

BACKGROUND OF THE INVENTION

FIG. 1 of the accompanying drawings illustrates a simplified example wireless mesh communications network which comprises a plurality of network nodes 10 interconnected by bidirectional wireless communications links 12. The network nodes 10 operate to communicate with one another, for the transfer of communications data therebetween. This type of network is known as a "mesh" network because of the multiple connections between network nodes that defines a virtual mesh of communications links 12.

Routing of data packets in a wireless mesh network is affected by many factors, including wireless link quality. This is particularly the case with outdoor networks in which the link quality can be affected by many different outdoor factors such as weather or other signal attenuating and blocking factors. In addition, low latency and low packet drop are highly desirable in such networks, since consumers desire high quality, high speed services, particularly for the delivery of online content over the wireless network. In a large wireless mesh network, reporting and control messages can take an undesirably long time to be communicated to and from a central network controller. This is a significant problem in high speed millimeter wave wireless networks, such as those operating in the 60 GHz waveband. In such high speed networks, control decisions need to be taken quickly in order to avoid packet drop and increased latency.

Existing network control schemes make use of central controllers to determine forwarding for data packets and groups of data packets across the network. In wireless networks in particular, high latency of such central control of routing can cause increased data packet drop, and associated resending and increased latency of the data transfer itself.

Accordingly, it is desirable to provide a technique that can overcome the problems of the existing control and routing methods, suitable for use in such high speed wireless communications networks.

SUMMARY OF THE INVENTION

According to a first aspect of the present invention, there is provided a method of maintaining data packet forwarding information in a first network node of a wireless mesh communications network having a plurality of network nodes interconnected by wireless communications links, the first network node having a plurality of outgoing wireless communications links connecting the first network node with respective neighbour network nodes of the network, the method comprising, at the first network node: receiving respective activity indicators for neighbour network nodes connected with the first network node by respective wireless communications links, each such activity indicator being indicative of activity of the node concerned for processing and forwarding of data packets towards a destination network node; determining respective link indicators for the outgoing wireless communications links of the first network node, each such link indicator being indicative of a data packet transmission characteristic for the link concerned; for each of the outgoing communications links of the first network node, combining the link indicator associated with that outgoing wireless communications link with the activity indicator relating to the neighbour network node connected with the first network node via that outgoing wireless communications link, thereby to generate a routing value for the outgoing wireless communications link for the destination network node; determining a selected next communications link for the destination network node from the generated routing values; and storing forwarding information relating to the selected next communications link for the destination network node concerned.

In one example, such method further comprises, at the first network node, generating such an activity indicator for the first network.

In one example, each activity indicator is generated by combining a node indicator indicative of processing of data packets by the node concerned a link indicator indicative of transmission of data packets from the node concerned, and the respective activity indicators received from neighbouring network nodes.

In such an example, each activity indicator may also be dependent upon a data packet flow rate through the node concerned.

In such an example, each node indicator may be indicative of a cost function for transfer of data packets through the network node concerned.

In such an example, each node indicator may be indicative of a differential of a cost function for transfer of data packets through the network node concerned.

In such an example, the cost function may be latency of data packet processing in the network node.

In such an example, the cost function may be derived from incoming and outgoing data packet flow rates for the network node concerned.

In one example, determining the selected next communications link includes evaluating the routing values for each of the communications links connected with the first network node.

In one example, the routing value for each communication link is a weighting value, and wherein determining the selected next communications link includes selecting a communications link in dependence upon the weighting values for the link connected with the first network node.

In one example, the data packet transmission characteristic is transmission latency in the link concerned.

In one example, the data packet transmission characteristic is derived from a data packet flow rate for the link concerned.

In one example, combining the link indicator with the activity indicator comprises adding the link indicator to the activity indicator to generate the routing value.

In one example, the routing value for a link is equal to the sum of the link indicator and activity indicator related to the link concerned.

In one example, the routing value for a link is equal to the sum of the link indicator and activity indicator related to the link concerned multiplied by a loading factor relating to the relative output of the link compared with other outgoing links form the first network node.

In one example, the data packet is an initial data packet of a group of data packets intended for the same destination, and wherein the method further comprises transmitting data packets in the group subsequent to the first data packet via the selected outgoing wireless communications link without reselection of the link.

According to a second aspect of the present invention, there is provided an apparatus comprising a data processing device operable in accordance with the method according to the first aspect of the present invention.

According to a third aspect of the present invention, there is provided a method of forwarding a data packet in a first network node of a wireless mesh communications network having a plurality of network nodes interconnected by wireless communications links, the first network node having a plurality of outgoing wireless communications links connecting the first network node with respective neighbour network nodes of the network, the method comprising, at the first network node maintaining forwarding information relating to a destination network node using a method in accordance with the first aspect of the present invention; receiving a data packet for forwarding; determining a destination network node in the wireless mesh communications network for the received data packet; determining a selected outgoing wireless communications link from the stored forwarding information in dependence upon the determined destination network node; and transmitting the data packet from the first network node to a neighbour network node over the selected outgoing wireless communications link.

According to a fourth aspect of the present invention, there is provided an apparatus comprising a data processing device operable in accordance with the method according to the third aspect of the present invention.

DETAILED DESCRIPTION OF THE PREFERRED EMBODIMENTS

As described above, FIG. 1 illustrates a simplified example wireless mesh communications network which comprises a plurality of network nodes 10 interconnected by bidirectional wireless communications links 12. The network nodes 10 operate to communicate with one another, for the transfer of communications data therebetween. This type of network is known as a "mesh" network because of the multiple connections between network nodes that defines a virtual mesh of communications links 12.

Figure 1:
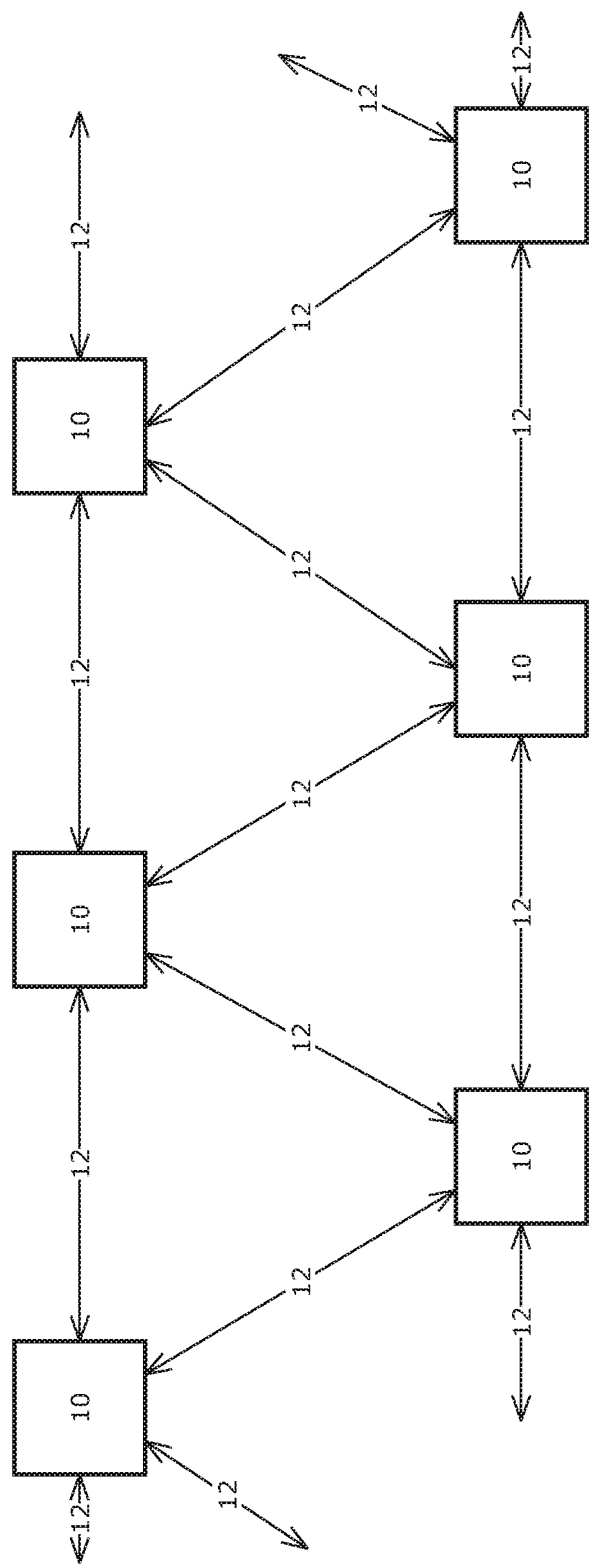
FIG. 1 illustrates schematically a wireless mesh communications network.
Figure 2:
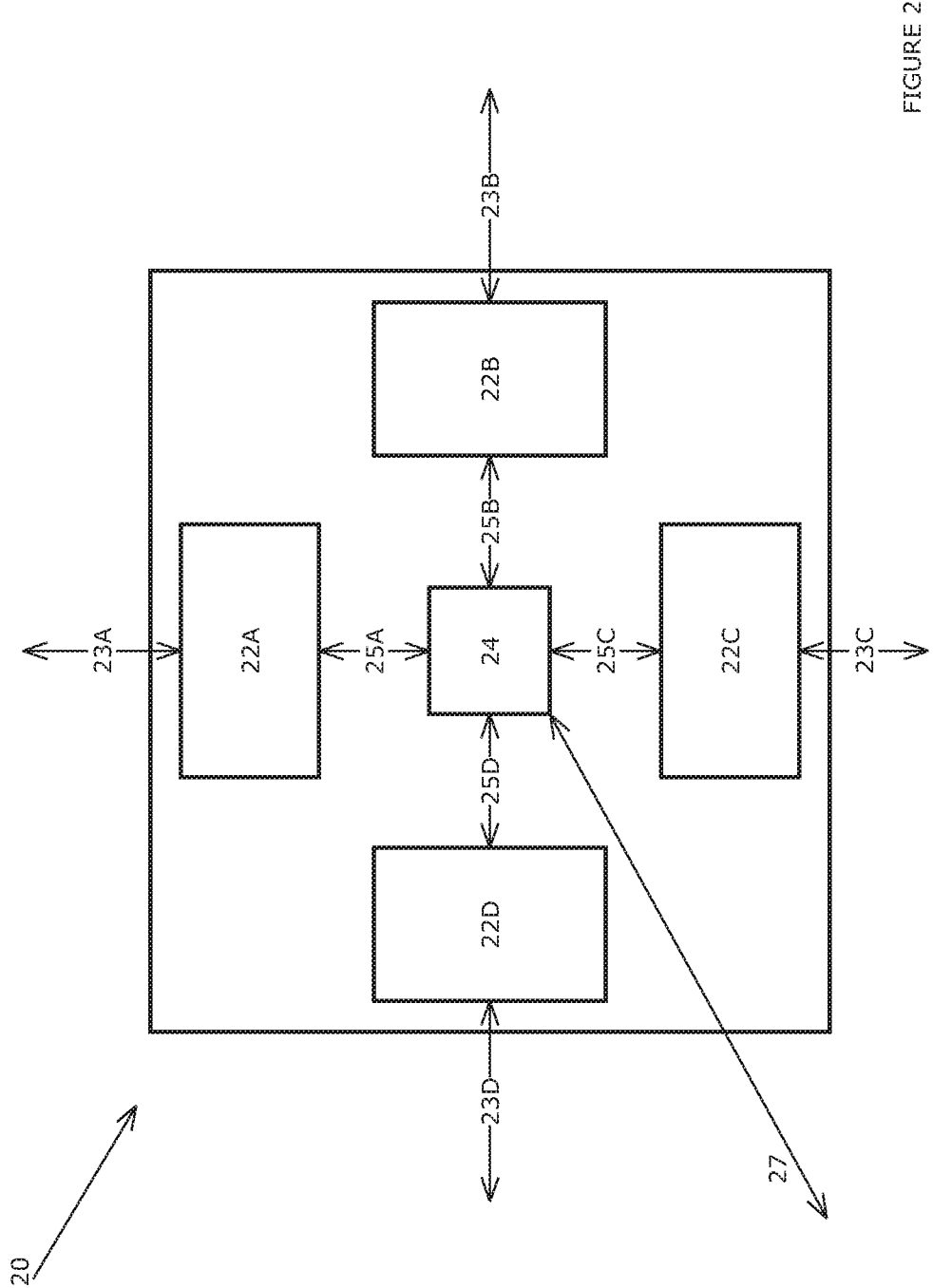
FIG. 2 illustrates schematically a network node device for use in the network of FIG. 1.

FIG. 2 illustrates an exemplary network node device 20 for use in the mesh communications network of FIG. 1. The network node device 20 comprises a number, in this case four, of communications devices 22 (22A, 22B, 22C and 22D), which communicate with other such devices in other network nodes of the network over wireless radio frequency (RF) links 23 (23A, 23B, 23C and 23D). It will be appreciated that any number of communications device can be provided, and that any number of those provided can be operational, dependent upon the particular application of the network node device.

The network node device 20 also includes an interconnect unit 24 which serves to interconnect the communications devices 22A, 22B, 22C and 22D via data links 25A, 25B, 25C and 25D. The interconnect unit 24 may be provided by a switch, or by integration of appropriate parts of the communications devices 22A, 22B, 22C and 22D, or by any other suitable unit. The interconnect unit 24 enables transfer of data packets between communications devices 22A, 22B, 22C and 22D.

The interconnect unit 24 may also include an external connection 27, typically a wired connection, for connecting the network node device 20 to wired infrastructure. The external connection may be a copper or optical connection, or may itself be provided by a wireless link. The external connection 27 may be an Ethernet connection or similar for connection to another network or device. The exact nature of the external connection 27 is not of importance in relation to the present description.

The interconnect unit may be provided by a network processor operable to provide data packet processing for the communications devices. The network processor may be integrated with one or more of the communications devices 22. Alternatively, each communications device may include a network processor.

Figure 3:
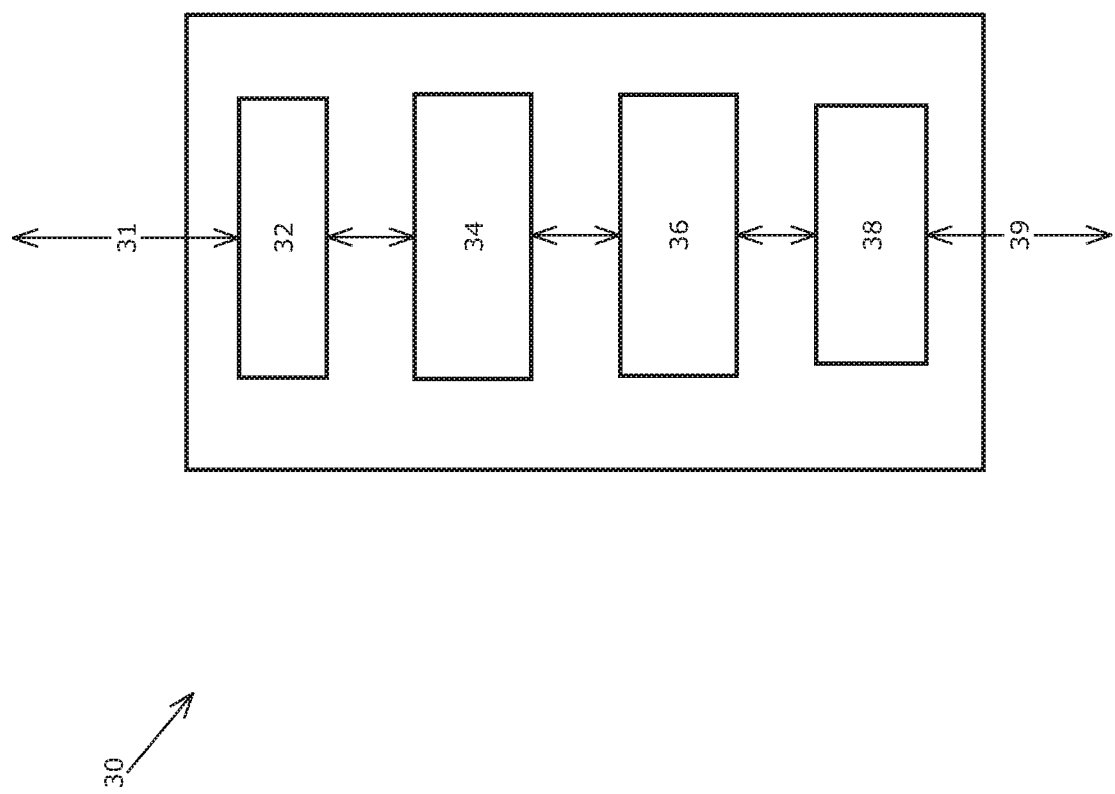
FIG. 3 illustrates schematically a communications device for use in the network node device of FIG. 2.

FIG. 3 illustrates an exemplary communications device 30 for use in the network node device of FIG. 2. The communications device 30 comprises a network processor 32, a MAC (media access control) device 34, a PHY (physical layer) processor 36 and an antenna device 38. In one example, the network processor 32, the MAC device 34 and the PHY processor 38 are provided on a single integrated circuit (IC) device.

The MAC device 34, the PHY processor 36 and the antenna device 38 provide a wireless communications channel 39 over which data packets are transferred with other network node devices using an appropriate modulation and coding technique.

The network processor 32 is operable to process data packets for transmission via the communication channel 39, and to process received data packets that are received through the communications channel 39.

The network processor 32 operates at the network layer level (layer 2/3), and is operable to determine routing information for data packets being transmitted across the network. The network processor 32 receives data packets for transmission over the network via a data link 31, and determines routing information across the network for those data packets. The network processor 32 also receives data packets from the communications channel 39 via the antenna device 38, the PHY processor 36 and the MAC device 34, and directs these data packets to an appropriate exit port of the network node device of which the communications device 30 is a part.

The MAC device 34 controls how data packets are transmitted and received on the communications channel 39. The MAC device 34 is operable to control flow of data packets to the PHY processor 36 including determination of the frequency channel to be used for a particular data packet, timing and synchronisation of data packet flow, and error detection and correction. A detailed explanation of the role and functions of the MAC device 36 will not be included here for the sake of clarity, and since these are well known and understood by the skilled reader, particularly with reference to the relevant communications standards of the Institute of Electrical and Electronics Engineers (the IEEE). The MAC device 34 provide the communications device 30 with layer 2 functionality.

The PHY processor 36 is operable to supply a modulated baseband signal including encoded data packets to the first antenna device 38. The PHY processor 36 uses appropriate modulation and coding schemes (MCSs) in dependence upon, for example, RF channel reliability and strength, required data transmission rates, and other factors. In a one particular example, the PHY processor 36 includes a plurality of processing elements which receive instructions from a single common instruction processor, and which process those instructions in parallel with one another.

The antenna device 38 includes radio frequency (RF) circuitry for transmitting radio frequency (RF) signals from an antenna thereof. The RF circuitry operates to generate RF modulated output signals for transmission from that antenna. The antenna is also able to receive RF signals, and to supply these to the RF circuitry. A detailed description of the antenna device will not be included here, for the sake of clarity. The principles of radio frequency transmission and reception are well known and are applicable to the first antenna device. In a preferred embodiment of the present invention the RF circuitry operates in the millimeter waveband, i.e. substantially in the 30 GHz to 300 GHz range. One particular example operates in the 60 GHz frequency band.

Together, the first antenna device 38 and the PHY processor 36 provide so-called layer 1 functionality for the communications channel 39 of the communications device 30. Layer 1 functionality provides the interface between the network and the transmission medium.

In accordance with the principles of an aspect of the present invention, the network processor 32 operates to determine a next hop (that is, the next communications link and node) for a data packet or group of data packets being routed across the network to a destination device.

Figure 4:
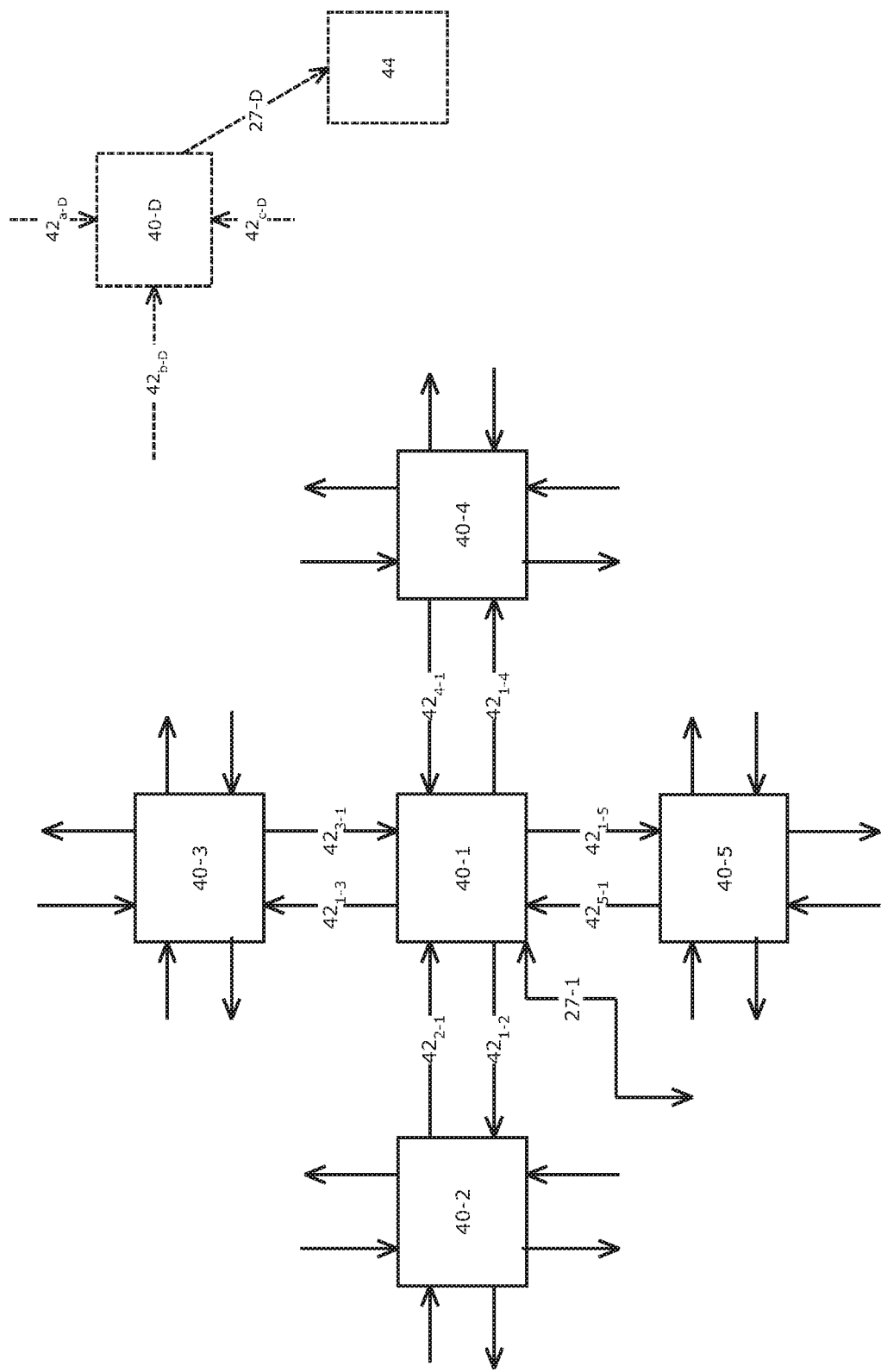
FIG. 4 illustrates schematically a simplified portion of a wireless communications network.
Figure 5:
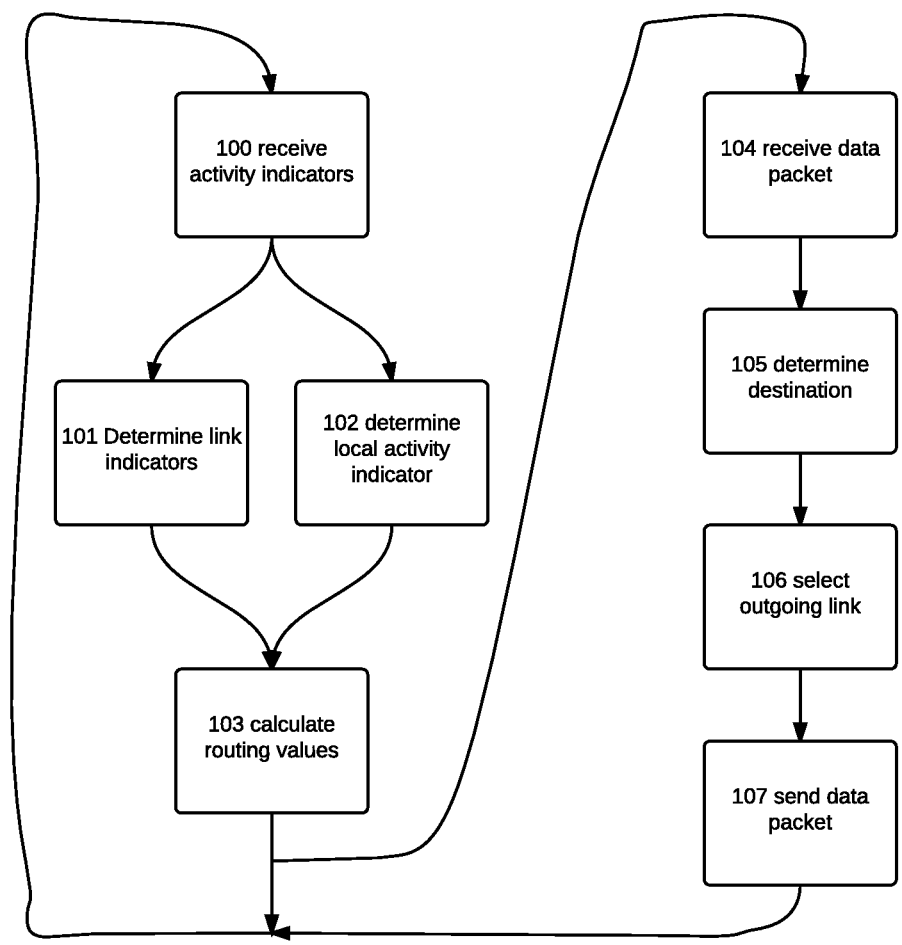
FIG. 5 is a flowchart illustrating a method of routing data packets in a wireless mesh communications network.

A method of determining a next step in a route of a data packet across a network will now be described with reference to FIGS. 4 and 5. FIG. 4 shows a simplified portion of a wireless mesh communications network for the purposes of explaining the principles of aspects of the present invention. It will be readily appreciated that this simplification is not intended to limit the scope of the applicability of the principles of the present invention, and that these principles may be applied to a wireless mesh communications network of any size and configuration. FIG. 5 is a flowchart showing steps in an exemplary method embodying another aspect of the present invention.

In FIG. 4, five network nodes 40 (40-1, 40-2, 40-3, 40-4 and 40-5) are connected via wireless communications links to form a mesh. For the sake of simplification, this description is centred on a first network node 40-1, although it will be readily appreciated that the description applies to any node on the network. This first network node 40-1 is able to transmit data to the other four nodes in the group via respective outgoing wireless communications links $42_{1-2}$, $42_{1-3}$, $42_{1-4}$, and $42_{1-5}$ and is able to receive data from the other four nodes in the group via respective incoming wireless communications links $42_{2-1}$, $42_{3-1}$, $42_{4-1}$, and $42_{5-1}$. The second to fifth network nodes 40-2, 40-3, 40-4 and 40-5 are all direct neighbour nodes of the first node 40-1. Each network node 40-n is able to communicate with a given number of other network nodes to form a plurality of such groups. These groups connect together to form the mesh network.

A destination network node 40-D of the mesh network connects a destination device 44 to the network via its external connection $27_{D-44}$. The destination network node 40-D is connected to the other nodes in the network over a plurality of routes, culminating in wireless links $42_{a-D}$, $42_{b-D}$ and $42_{c-D}$. It will be appreciated that the destination node 40-D can have any appropriate number of wireless link 42, and that the routes to the destination node 40-D can be through any number of network nodes, and over any number of wireless links of the mesh network.

It will be readily appreciated that the wireless links shown in FIG. 4 are exemplary, and may be provided by any appropriate number of links. For example, a single full duplex link may be used to communicate in two directions between nodes, or a pair of unidirectional links may be provided (simplex communications). Other techniques, such as time division multiplexing (TDM), time division duplex (TDD), time division multiple access (TDMA) or frequency division multiple access (FDMA) may be used for the communications links between nodes.

For the first network node 40-1, each of the neighbour nodes 40-2, 40-3, 40-4, and 40-5 provides node information indicative of the activity of the node concerned for routing of data packets to the destination node in the form of an activity indicator A(j) where j is the node concerned (for example, 40-2, 40-3, 40-4 or 40-5). In one example, this activity indicator A(j) is indicative of the latency of processing data packets through the node concerned. In such an example, the activity indicator A(j) can be seen to represent the cost associated with the latency of queuing of data packets in the node concerned. An activity indicator for a node combines measurements relating to processing of data packets at the node concerned (node indicator, or node cost function), and measurements concerning transmission of data packets on links connected to that node (link indicator) with activity indicators received from neighbouring nodes for those neighbouring nodes. Data packet flow rates for the node concerned may also be used in the calculation of the activity indicator for a given node.

The second network node 40-2 supplies an activity indicator A(2) to the first network node 40-1. This activity indicator A(2) represents the activity of the second network node for routing of data packets. Each of the third, fourth and fifth network nodes supply respective activity indicators A(3), A(4), and A(5) to the first network node 40-1. These activity indicators are received by the first network node 40-1 (step 100), and are used to determine the activity indicator A(1) for the first node, in combination with the node and link indicators for the first network node. Similarly, the other network nodes calculate their respective activity indicators based on received neighbour activity indicators and local node and link indicators.

The first network node 40-1 determines (step 101) a link indicator L(i,j) for each outgoing wireless communications link $42_{1-2}$, $42_{1-3}$, $42_{1-4}$, and $42_{1-5}$ from the first network node 40-1 to those direct neighbouring nodes 40-2, 40-3, 40-4 and 40-5. A link indicator may be represented by L(i,j) where i is the transmitting network node and j is the receiving network node. In the example, the first network node 40-1 determines link indicators L(1,2), L(1,3), L(1,4) and L(1,5) for the outgoing wireless communications links $42_{1-2}$, $42_{1-3}$, $42_{1-4}$, and $42_{1-5}$ connecting the first network node 40-1 with the second, third, fourth and fifth network nodes 40-2, 40-3, 40-4 and 40-5 respectively.

The network processor 32 of the first network node 40-1 combines the activity indicator A(j) for a neighbour network node with the link indicator L(i,j) for the outgoing wireless communications link connecting the first network node to that neighbour network node in order to derive (step 103) a routing value R(i,j,k) for each of the outgoing wireless communications links $42_{1-2}$, $42_{1-3}$, $42_{1-4}$, and $42_{1-5}$, where i is the current node, j is the neighbour node, and k is the destination node. For example, the routing value R(i,j,k) for the second network node 40-2 is represented by the notation R(1,2,D). The routing value R(i,j,k) indicates a relative quantitative measure of the suitability of an outgoing communications wireless link for the forwarding of the data packet from the first network node 40-1 towards the destination network node 40-D.

In one example, the routing value may also be dependent upon the current traffic flow on the link concerned. One or more stored historical values of the link indicators, activity indicators, traffic flow, and routing values may also be used in calculation of a current routing value.

The network processor 32 then determines the current best next hop for a route to a given destination, and this information is stored. For example, the information may be stored in a look up table using the destination address as the look up to output the next hop information.

The first network node 40-1 repeats the calculation of the routing values (steps 100 to 103) in order to maintain current values. For example, the neighbour network nodes 40-2, 40-3, 40-4 and 40-5 may send regular node activity updates, may provide this information when the activity of the node changes by more than a predetermined amount, or when the link activity changes. The first network node 40-1 may recalculate the routing values at regular intervals, or may recalculate when updated activity information is received from the neighbouring nodes, or when updated link information is received or calculated for the links. The updated routing values are then used to determine updated next hop information for each destination.

The routing values may also be in the form of proportional routing (eg 40%, 30%, 20%, 10% to each of four connected ports, for a specified destination). This can be achieved by either deterministically forwarding packets to the relevant ports to maintain the proportions as closely as possible, or simply routing each packet to a random port, with the probability set by the proportions in R(i,j,k).

The network processor 32 also determines (step 102) a local activity indicator A(1) for the first network node 40-1. This activity indicator A(1) combines a local node indicator relating to the processing of data packets within the node, local link indicators relating to the transmission of data packets on the links attached to the node with activity indicators received from neighbouring nodes for those neighbouring nodes. The activity indicator A(1) may also be dependent upon other information such as current data packet flow rates, and/or one or more stored historical value selected from the activity indicators, routing values, data packet flow rate, node indicators, and link indicators. The activity indicator A(1) is transmitted to the neighbouring nodes for use in determining routing steps from those nodes.

When a data packet is received by the node, the network processor determines the destination to which the data packet is headed, and determines the next hop form the stored next hop information. The data packet is then routed to the specified next node in the network over the specified communications link.

In one example embodiment, the node indicator N for a network node is indicative of latency for forwarding of data packets through the node concerned, and the link indicator L is indicative of latency of transmission of data packets across the link, such that the routing value R(i,j,k) is indicative of the latency of the route that includes the outgoing wireless communications link concerned. The node indicators N and link indicators L may be simple measures of the latency of nodes and link respectively, or may be differentials of those values. In one example, where the activity indicator is equal to the node indicator, the routing value R is determined by adding together the activity indicator A and link indicator L values. This routing value may also be dependent upon the current traffic flow on the link concerned. One or more stored historical values of the link indicators, activity indicators, traffic flow, and routing values may also be used in calculation of a current routing value.

In another example, the activity indicator A for each node is determined by weighting the node indicator for that node in proportion to the traffic routed from the source node to the destination node through the node concerned using a loading factor. The routing value R is then equal to the sum of the link indicator and activity indicator A. The loading factor means that the activity indicator A for a particular neighbour node can be weighted proportionally with respect to relative link usage. In such a manner, a technique in accordance with an aspect of the present invention is able to provide distance vector routing, using latency as an edge weight metric.

The node, activity and link indicators may be determined in connection with the transport of aggregated user data packets, rather than to individual user data packets themselves.

In one example, in order to determine best next hop for a given destination, the network processor 32 determines the lowest non-zero routing value R(i,j,k), and determines the outgoing wireless communications link associated with that value. This is the information that is stored for use in forwarding the next data packet that requires forwarding towards the destination concerned.

In another example, the network processor 32 uses the routing values R(i,j,k) as weighting values for proportional routing from the network node. The weighting values are used to determine the probability that a given link is chosen as the outgoing link.

On start-up of a network employing the techniques of the present invention, the routing values R(i,j,k) can be calculated and propagated across the network. Alternatively, an example embodiment sets initial non-zero values for each routing value.

Following reception of a data packet, the header thereof is examined in order to determine the destination for the data packet. The destination information is used to look up the next hop information, and in particular to determine the next wireless communications link for the data packet concerned. The data packet is then sent from the first network node 40-1 over the selected outgoing wireless communications link to the next network node. The data packet is then forwarded from the next network node using the same process as for the first network node. The process is repeated until the data packet reaches the destination network node, and is transferred to the receiving device connected to the destination network node.

Although latency and measures directly related to latency are the most useful measures for determining forwarding of a data packets, the node, activity and link indicators N, A and L may be indicative of other parameters associated with transfer of data packets across nodes and link respectively, or may be a combination of latency and other parameters. The specific technique for combining the node, activity and link indicators will depend upon the nature of the node, activity and link indicators, and by user defined requirements such as performance metrics or cost functions.

In a specific example method embodying the present invention, the node indicator for a node (i) is given by:

$$N(i) = \frac{\lambda_n(i)}{\mu_n(i)(\mu_n(i) - \lambda_n(i))} + \frac{(\lambda_n(i))^2}{2\mu_n(i)(\mu_n(i) - \lambda_n(i))^2} + \frac{1}{\mu_n(i)}$$

And the link indicator for a link (i,j) is given by:

$$L(i, j) = \frac{\lambda_l(i, j)}{\mu_l(i, j)(\mu_l(i, j) - \lambda_l(i, j))} + \frac{(\lambda_l(i, j))^2}{2\mu_l(i, j)(\mu_l(i, j) - \lambda_l(i, j))^2} + \frac{1}{\mu_l(i, j)}$$

Where $\mu_n(i)$ is the switching rate of the $i^{th}$ node; $\lambda_n(i)$ is the flow rate into the switch of the $i^{th}$ node; $\mu_l(i,j)$ is the transmission rate of link (i,j); and $\lambda_l(i,j)$ is the flow rate into link (i,j). In this example, we are concerned with a network where all packets have identical size, and thus these four terms can be expressed in packets/s without loss of generality. Furthermore, these terms, N(i) and L(I,j) can be interpreted as the differential of the product of the expected latency and the flow rate for the nodes and links respectively. The following combination to give the activity indicator A(i,.,k) and routing indicator R(i,j,k) embodies the case where the routing converges on the minimum expected latency for the entire network, for a network consisting of node with a single central switch, and where nodes are connected by full-duplex links.

The activity indicator for the $i^{th}$ node is evaluated as:

$$A(i,.,k) = \text{Mu}(i,:,k)(A(:,:,k) + L(i,:)^T) + N(i)$$

Where Mu is the flowrate for data packets from node i through the current node to node k (normalised so that it sums to one).

From A(:,.,k), the routing value R(i,j,k) is evaluated:

$$R(i,j,k) = k3(\text{MAX}\{MU(i,j,k) - k2(A(j,.,k) + L(i,j)) + k1; 0\})$$

where k1 and k2 are constants (positive, negative or zero), k3 and the 'MAX' function ensure that R is a valid probability mass function (PMF), and MU(i,j,k) is the current traffic flow (in packets in this example).

For a distributed embodiment, for a given node 'i', only part of the routing matrix will be available locally, namely R(i,.,.). This is, however, sufficient for routing, as for a given destination, 'k', the relevant part of the routing indicator R(i,.,k) is in the form of a valid PMF with each element corresponding to a link, and therefore each routing decision is random with probability of selecting each link given by the PMF. This is valid whether the routing is performed on each packet, or simply for the first packet of a session.

The first network node 40-1 receives a data packet (step 104) to be forwarded towards the destination network node 40-D. The data packet may be received from any one of the second to fifth network nodes 40-2, 40-3, 40-4 and 40-5, or from the external connection 27₁ of the first network node 40-1. The source of the data packet is not of importance for the forwarding decision making process. The network processor 32 of the first network node 40-1 receives and decodes the data packet in order to determine the destination of the data packet (step 105). This destination information is commonly stored in a header portion of the data packet, but may alternatively be stored in data packet group information or the like.

The destination information is determined, and the network processor 32 determines (step 106) the outgoing wireless communications link for the data packet from the first network node 40-1. In order to determine the outgoing wireless communications link, the network processor 32 of the first network node 40-1 uses the stored next hop information determined as described above.

In accordance with an aspect of the present invention, this determination of the outgoing wireless communications link is made locally at the network node from which the data packet is to be transmitted. Once the outgoing wireless communications link has been determined, the data packet is transmitted from the network node on that determined link (step 107).

The forwarding calculation and process may be carried out in this manner for each data packet received by a network node. Alternatively, the process is carried out for a first data packet of a group or series of data packets to be forwarded to the same destination in the network, so that all of the data packets in the group or series are forwarded over the same outgoing wireless communications link.

It will be understood that a wireless communications link may be a single radio frequency link, or may be a communications channel of a time division multiplexed link, or a communications channel of a frequency division multiplexed link.

Accordingly, a technique embodying the principles of the present invention is able to provide local routing of data packets, which reduces latency of the routing procedure, and hence of the data packet flow across the network.

The invention claimed is:

1. A method of maintaining data packet forwarding information in a first network node of a wireless mesh communications network having a plurality of network nodes interconnected by wireless communications links, the first network node having a plurality of outgoing wireless communications links connecting the first network node with respective neighbour network nodes of the network, the method comprising, at the first network node:

receiving respective activity indicators for neighbour network nodes connected with the first network node by respective wireless communications links, each such activity indicator being indicative of activity of the node concerned for processing and forwarding of data packets towards a particular destination network node;

determining respective link indicators for the outgoing wireless communications links of the first network node, each such link indicator being indicative of a data packet transmission characteristic for the link concerned;

for each of the outgoing communications links of the first network node, combining the link indicator associated with that outgoing wireless communications link with the activity indicator relating to the neighbour network node connected with the first network node via that outgoing wireless communications link, thereby to generate a routing value for the outgoing wireless communications link for the destination network node;

determining a selected next communications link for the destination network node from the generated routing values; and storing forwarding information relating to the selected next communications link for the destination network node concerned, wherein each of the respective activity indicators is generated by a network processor of the node concerned by combining a node indicator indicative of processing of data packets by the node concerned a link indicator indicative of transmission of data packets from the node concerned, and the respective activity indicators received from neighbouring network nodes of the node concerned, wherein each of the respective activity indicators is also dependent upon a data packet flow rate through the node concerned towards the destination network node, and each node indicator is indicative of a differential of a cost function for transfer of data packets through the network node concerned.

2. A method as claimed in claim 1, further comprising, at the first network node, generating such an activity indicator for the first network.

3. A method as claimed in claim 1, wherein each node indicator is indicative of a cost function for transfer of data packets through the network node concerned.

4. A method as claimed in claim 1, wherein each node indicator is indicative of a cost function for transfer of data packets through the network node concerned, and wherein the cost function is latency of data packet processing in the network node.

5. A method as claimed in claim 1, wherein each node indicator is indicative of a cost function for transfer of data packets through the network node concerned, and wherein the cost function is derived from incoming and outgoing data packet flow rates for the network node concerned.

6. A method as claimed in claim 1, wherein each node indicator is indicative of a differential of a cost function for transfer of data packets through the network node concerned, and wherein the cost function is latency of data packet processing in the network node.

7. A method as claimed in claim 1, wherein each node indicator is indicative of a differential of a cost function for transfer of data packets through the network node concerned, and wherein the cost function is derived from incoming and outgoing data packet flow rates for the network node concerned.

8. A method as claimed in claim 1, wherein determining the selected next communications link includes evaluating the routing values for each of the communications links connected with the first network node.

9. A method as claimed in claim 1, wherein the routing value for each communication link is a weighting value, and wherein determining the selected next communications link includes selecting a communications link in dependence upon the weighting values for the link connected with the first network node.

10. A method as claimed in claim 1, wherein the data packet transmission characteristic is transmission latency in the link concerned.

11. A method as claimed in claim 1, wherein the data packet transmission characteristic is derived from a data packet flow rate for the link concerned.

12. A method as claimed in claim 1, wherein combining the link indicator with the activity indicator comprises adding the link indicator to the activity indicator to generate the routing value.

13. A method as claimed in claim 1, wherein the routing value for a link is equal to the sum of the link indicator and activity indicator related to the link concerned.

14. A method as claimed in claim 1, wherein the routing value for a link is equal to the sum of the link indicator and activity indicator related to the link concerned multiplied by a loading factor relating to the relative output of the link compared with other outgoing links form the first network node.

15. A method as claimed in claim 1, wherein the data packet is an initial data packet of a group of data packets intended for the same destination, and wherein the method further comprises transmitting data packets in the group subsequent to the first data packet via the selected outgoing wireless communications link without reselection of the link.

16. A method of forwarding a data packet in a first network node of a wireless mesh communications network having a plurality of network nodes interconnected by wireless communications links, the first network node having a plurality of outgoing wireless communications links connecting the first network node with respective neighbour network nodes of the network, the method comprising, at the first network node:
maintaining forwarding information relating to a destination network node using a method as claimed in any one of the preceding claims;
receiving a data packet for forwarding;
determining a destination network node in the wireless mesh communications network for the received data packet;
determining a selected outgoing wireless communications link from the stored forwarding information in dependence upon the determined destination network node; and
transmitting the data packet from the first network node to a neighbour network node over the selected outgoing wireless communications link.

17. Apparatus for maintaining data packet forwarding information in a first network node of a wireless mesh communications network having a plurality of network nodes interconnected by wireless communications links, the first network node having a plurality of outgoing wireless communications links connecting the first network node with respective neighbour network nodes of the network, the apparatus comprising, at the first network node:
a data processing device operable to:
receive respective activity indicators for neighbour network nodes connected with the first network node by respective wireless communications links, each such activity indicator being indicative of activity of the neighbour node concerned for processing and forwarding of data packets towards a particular destination network node;
to determine respective link indicators for the outgoing wireless communications links of the first network node, each such link indicator being indicative of a data packet transmission characteristic for the link concerned;
for each of the outgoing communications links of the first network node, to combine the link indicator associated with that outgoing wireless communications link with the activity indicator relating to the neighbour network node connected with the first network node via that outgoing wireless communications link, thereby to generate a routing value for the outgoing wireless communications link for the destination network node;
to determine a selected next communications link for the destination network node from the generated routing values; and
to store forwarding information relating to the selected next communications link for the destination network node concerned,
wherein each of the respective activity indicators is generated by a network processor of the node concerned by combining a node indicator indicative of processing of data packets by the node concerned a link indicator indicative of transmission of data packets from the node concerned, and the respective activity indicators received from neighbouring network nodes of the node concerned, wherein each of the respective activity indicators is also dependent upon a data packet flow rate through the node concerned towards the destination network node, and each node indicator is indicative of a differential of a cost function for transfer of data packets through the network node concerned.

18. Apparatus as claimed in claim 17, wherein each activity indicator relates to a combination of a node indicator indicative of processing of data packets by the node concerned, a link indicator indicative of transmission of data packets from the node concerned, and the respective activity indicators received from neighbouring network nodes, and wherein each activity indicator is also dependent upon a data packet flow rate through the node concerned.

19. Apparatus as claimed in claim 17, wherein each activity indicator is indicative of a differential of a cost function for transfer of data packets through the network node concerned.

20. Apparatus as claimed in claim 17, wherein each activity indicator is indicative of a cost function for transfer of data packets through the neighbour network node concerned, and wherein the cost function is latency of data packet processing in the network node.

21. Apparatus as claimed in claim 17, wherein each activity indicator is indicative of a differential of a cost function for transfer of data packets through the network node concerned, and wherein the cost function is latency of data packet processing in the network node.

22. A method as claimed in claim 17, wherein each activity indicator is indicative of a cost function for transfer of data packets through the neighbour network node concerned, and wherein the cost function is derived from incoming and outgoing data packet flow rates for the network node concerned.

23. A method as claimed in claim 17, wherein each activity indicator is indicative of a differential of a cost function for transfer of data packets through the neighbour network node concerned, and wherein the cost function is derived from incoming and outgoing data packet flow rates for the network node concerned.

24. Apparatus as claimed in claim 17, wherein the network processor is operable to determine the selected next communications link by evaluating the routing values for each of the communications links connected with the first network node.

25. Apparatus as claimed in claim 17, wherein the routing value for each communication link is a weighting value, and wherein the network processor is operable to determine the selected next communications link by selecting a communications link in dependence upon the weighting values for the link connected with the first network node.

26. Apparatus as claimed in claim 17, wherein the data packet transmission characteristic is transmission latency in the link concerned.

27. Apparatus as claimed in claim 17, wherein the data packet transmission characteristic is derived from a data packet flow rate for the link concerned.

28. Apparatus as claimed in claim 17, wherein the data packet transmission characteristic is derived from a data packet flow rate for the link concerned.

29. Apparatus as claimed in claim 17, wherein the routing value for a link is equal to the sum of the link indicator and activity indicator related to the link concerned.

30. Apparatus as claimed in claim 17, wherein the routing value for a link is equal to the sum of the link indicator and activity indicator related to the link concerned multiplied by a loading factor relating to the relative output of the link compared with other outgoing links form the first network node.

31. Apparatus as claimed in claim 17, wherein the data packet is an initial data packet of a group of data packets intended for the same destination, and wherein the data processing device is further operable to transmit data packets in the group subsequent to the first data packet via the selected outgoing wireless communications link without reselection of the link.

32. Apparatus for forwarding data packets in a first network node of a wireless mesh communications network having a plurality of network nodes interconnected by wireless communications links, the first network node having a plurality of outgoing wireless communications links connecting the first network node with respective neighbour network nodes of the network, the apparatus comprising, at the first network node:
   apparatus for maintaining forwarding information relating to a destination network node as claimed in claim 17;
   a data processing device operable to receive a data packet for forwarding, to determine a destination network node in the wireless mesh communications network for such a received data packet, and to determine a selected outgoing wireless communications link from the stored forwarding information in dependence upon the determined destination network node; and
   a radio frequency transmission device operable to transmit the data packet from the first network node to a neighbour network node over such a selected outgoing wireless communications link.

* * * * *